Sept. 23, 1958 H. A. MICHLIN Re. 24,540
ELECTROLUMINESCENT LIGHT MEANS
Original Filed April 10, 1951
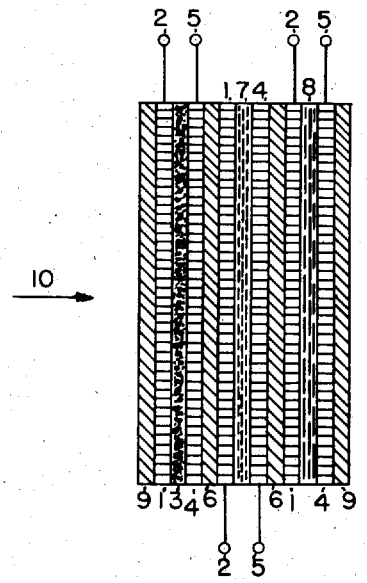

United States Patent Office

Re. 24,540
Reissued Sept. 23, 1958

24,540

ELECTROLUMINESCENT LIGHT MEANS

Hyman A. Michlin, New York, N. Y.

Original No. 2,730,644, dated January 10, 1956, Serial No. 220,173, April 10, 1951. Application for reissue October 29, 1956, Serial No. 619,097

4 Claims. (Cl. 313—108)

Matter enclosed in heavy brackets [ ] appears in the original patent but forms no part of this reissue specification; matter printed in italics indicates the additions made by reissue.

This invention relates to electrically controlling electroluminescence to vary the resultant color emitted therefrom.

One object of the invention is to electrically vary a resultant color emission from a thin electroluminescent source.

The single figure in the drawing schematically illustrates a mode of the invention.

This invention is based on the electroluminescent phenomenon which is observed in substances having electric energy applied thereto, such as varying electric energy; and an example of which is the ZnS:Cu phosphor, the activator Cu of which can be varied, as is known to the art, to produce an emission in different parts of the spectrum of visible light.

Referring to the drawing, the combined layers of electroluminescent substances 3, 7 and 8, the transparent electrode layers 1 and 4 and the transparent insulation layers 6 are so thin as to form a controllable light source from a thin electroluminescent unit. Each thin layer of electroluminescent substances 3, 7 or 8 is capable of luminescing in a different part of the visible spectrum on application of varying electric energy thereto, and is sandwiched between a thin transparent electrode layer 1 and a thin transparent electrode layer 4 so as to form separate electroluminescent assemblies, and each of said assemblies is arranged in superimposed relation to each other separated by a thin transparent layer of insulation 6 so as to form a thin color controllable electroluminescent unit with the transparent insultaion layers 9 forming the protecting ends of the said thin electroluminescent unit.

The thin transparent electrode layers 1 are impressed with a potential from electric energy sources 2 and the thin transparent electrode layers 4 are impressed with a different potential from electric energy sources 5 so that by varying the potential differences and varying the intensities of potential differences transmitted to each electroluminescent assembly there is effected a control of the resultant color emitted from the electroluminescent unit in accordance with the intensities of potential differences transmitted to each electroluminescent assembly. The potential differences between the electric energy sources 2 and 5 to produce electroluminescence to electroluminescent substances are known to the prior art, and which can be produced by varying electric energy. In this embodiment varying potential is used to produce electroluminescence.

*All the layers are of a substance that will permit the transmission of light where needed.*

Arrow 10 indicates the viewing direction from a viewer.

The drawing and specification are for illustration purposes and are not to be construed as restrictive; and, therefore, while I have disclosed one particular means for practicing my invention, it will be obvious that other structures may be of equal advantage, and, I therefore, do not wish to be limited to the particular method set [set] forth above except as my invention is so limited by the appended claims.

I claim:

*1.* A thin electroluminescent light means capable of being electrically controlled to vary resultant color emitted therefrom comprising a plurality of thin electroluminescent layers, each of said thin electroluminescent layers luminescing in a different part of the light spectrum, a thin transparent electrode layer on each side of each of said thin electroluminescent layers to thereby form separate electroluminescent assemblies, each of said electroluminescent assemblies arranged in superimposed relation to each other, and a thin layer of transparent insulation separating each of said electroluminescent assemblies.

*2. An electroluminescent light means emitting resultant color and capable of being electrically controlled to vary the resultant color emitted therefrom comprising a plurality of electroluminescent layers, each of said layers luminescing in a different part of the light spectrum, said layers in superimposed relation to each other, and means for separately transmitting electric energy through each of the said layers to thereby control the emitted color from each of the electroluminescent layers so as to vary the resultant color emitted therefrom.*

*3. An electroluminescent light means emitting resultant color and capable of being electrically controlled to vary the resultant color emitted therefrom comprising a plurality of separately activated electroluminescent layers in superimposed relation to each other, each said layer luminescing in a different part of the light spectrum; and a plurality of means to electrically activate said layers, each of said means to separately active each of said layers to thereby control the emitted color from each of the electroluminescent layers so as to vary the resultant color emitted therefrom.*

*4. A thin electroluminescent light means capable of being electrically controlled to vary resultant color emitted therefrom comprising a plurality of thin electroluminescent layers, each of said layers luminescing in a different part of the light spectrum, a thin electrode layer on each side of each of the thin electroluminescent layers to thereby form separate electroluminescent assemblies, each of said assemblies arranged in superimposed relation to each other, said electrode layers on one end and the layers between said superimposed electroluminescent layers are transparent, a thin layer of insulation separating each of the assemblies.*

References Cited in the file of this patent or the original patent

UNITED STATES PATENTS

| | | |
|---|---|---|
| 2,248,985 | Gray | July 15, 1941 |
| 2,270,373 | Kallmann et al. | Jan. 20, 1942 |
| 2,446,791 | Schroeder | Aug. 10, 1948 |
| 2,455,710 | Szegho | Dec. 7, 1948 |
| 2,516,314 | Goldsmith | July 25, 1950 |
| 2,518,200 | Sziklai et al. | Aug. 8, 1950 |
| 2,552,386 | Sziklai et al. | May 8, 1951 |
| 2,580,073 | Burton | Dec. 25, 1951 |
| 2,590,018 | Koller et al. | Mar. 18, 1952 |
| 2,594,740 | De Forest et al. | Apr. 29, 1952 |

OTHER REFERENCES

Scheraga et al.: "Video Handbook," second printing, 1949, William F. Boyce, publisher, page 61.